US006945366B2

(12) United States Patent
Taba

(10) Patent No.: US 6,945,366 B2
(45) Date of Patent: Sep. 20, 2005

(54) ANTI-THEFT VEHICLE SYSTEM

(75) Inventor: Serge Taba, Mission Viejo, CA (US)

(73) Assignee: Gatekeeper Systems, LLC., Irvine, CA (US)

(*) Notice: Subject to any disclaimer, the term of this patent is extended or adjusted under 35 U.S.C. 154(b) by 0 days.

(21) Appl. No.: 10/222,404

(22) Filed: Aug. 16, 2002

(65) Prior Publication Data

US 2004/0031650 A1 Feb. 19, 2004

(51) Int. Cl.$^7$ ............................................. B60B 33/00
(52) U.S. Cl. ..................... 188/1.12; 188/17; 188/19; 188/20; 188/31; 188/163
(58) Field of Search ......................... 188/1.12, 17, 19, 188/20, 31, 29, 111, 158, 163; 16/35 R; 340/568.5; 280/33.994

(56) References Cited

U.S. PATENT DOCUMENTS

| 1,928,750 A | 10/1933 | Apple et al. |
| 1,968,584 A | 7/1934 | Apple |
| 2,964,140 A | 12/1960 | Berezny |
| 3,029,905 A | 4/1962 | Nowak |
| 3,031,037 A | 4/1962 | Stollman |
| 3,031,038 A | 4/1962 | Chait |
| 3,117,655 A | 1/1964 | Skupas et al. |
| 3,157,871 A | 11/1964 | Umanoff |
| 3,495,688 A | 2/1970 | Isaacks |
| 3,590,962 A | 7/1971 | Parker et al. |
| 3,652,103 A | 3/1972 | Higgs |
| 3,717,225 A | 2/1973 | Rashbaum et al. |
| 3,809,191 A | 5/1974 | Woodward |
| 3,820,623 A | 6/1974 | Akashi et al. |
| 4,242,668 A | 12/1980 | Herzog |
| 4,338,594 A | 7/1982 | Holm |
| 4,424,511 A | 1/1984 | Alberts, Jr. |
| 4,472,706 A | 9/1984 | Hodge et al. |
| 4,577,880 A | 3/1986 | Bianco |
| 4,591,175 A | 5/1986 | Upton et al. |
| 4,609,075 A | 9/1986 | Snedeker |
| 4,629,036 A | * 12/1986 | Choy ........................ 188/1.12 |
| 4,683,461 A | 7/1987 | Torre |
| 4,772,880 A | 9/1988 | Goldstein et al. |
| 4,809,824 A | 3/1989 | Fargier et al. |
| 4,868,544 A | 9/1989 | Havens |
| 4,878,050 A | 10/1989 | Kelley |
| 4,908,604 A | 3/1990 | Jacob |
| 4,987,406 A | 1/1991 | Reid |
| 4,990,890 A | 2/1991 | Newby |
| 5,000,297 A | 3/1991 | Shaw et al. |
| 5,053,768 A | 10/1991 | Dix, Jr. |
| 5,194,844 A | 3/1993 | Zelda |
| 5,283,550 A | 2/1994 | MacIntyre |
| 5,315,290 A | * 5/1994 | Moreno et al. .......... 340/568.5 |
| 5,349,329 A | 9/1994 | Smith |
| 5,357,182 A | 10/1994 | Wolfe et al. |
| 5,394,962 A | 3/1995 | Gray |
| 5,432,412 A | 7/1995 | Harris et al. |
| 5,465,986 A | 11/1995 | MacRae |

(Continued)

FOREIGN PATENT DOCUMENTS

| DE | 37 00411 | 7/1987 |
| EP | 532472 A1 | 3/1993 |
| GB | 2 137 388 | 10/1984 |
| GB | 2 266 643 | 11/1993 |
| WO | WO 92/15476 | 9/1992 |

Primary Examiner—Robert A. Siconolfi
Assistant Examiner—Devon Kramer
(74) Attorney, Agent, or Firm—Bliss McGlynn, P.C.

(57) ABSTRACT

An anti-theft vehicle system for a vehicle wheel having a rotational axis includes a linear actuator disposed within the vehicle wheel for operatively engaging and disengaging an interior surface of the vehicle wheel to resist and allow rotational movement of the vehicle wheel about the rotational axis. The anti-theft vehicle system further includes a receiver mounted within the vehicle wheel to receive a signal to activate the linear actuator.

14 Claims, 5 Drawing Sheets

U.S. PATENT DOCUMENTS

| | | |
|---|---|---|
| 5,576,691 A | 11/1996 | Coakley et al. |
| 5,598,144 A | 1/1997 | Lace |
| 5,607,030 A | 3/1997 | Swift et al. |
| 5,821,856 A | 10/1998 | Lace |
| 5,823,302 A * | 10/1998 | Schweninger ............... 188/111 |
| 5,831,530 A | 11/1998 | Lace et al. |
| 6,037,869 A | 3/2000 | Lace |
| 6,102,414 A * | 8/2000 | Schweninger .......... 280/33.994 |
| 6,127,927 A | 10/2000 | Durban et al. |
| 6,139,117 A * | 10/2000 | Shirai et al. .................... 303/3 |
| 6,155,385 A | 12/2000 | Basnett |
| 6,161,849 A * | 12/2000 | Schweninger .......... 280/33.994 |
| 6,362,728 B1 | 3/2002 | Lace et al. |

\* cited by examiner

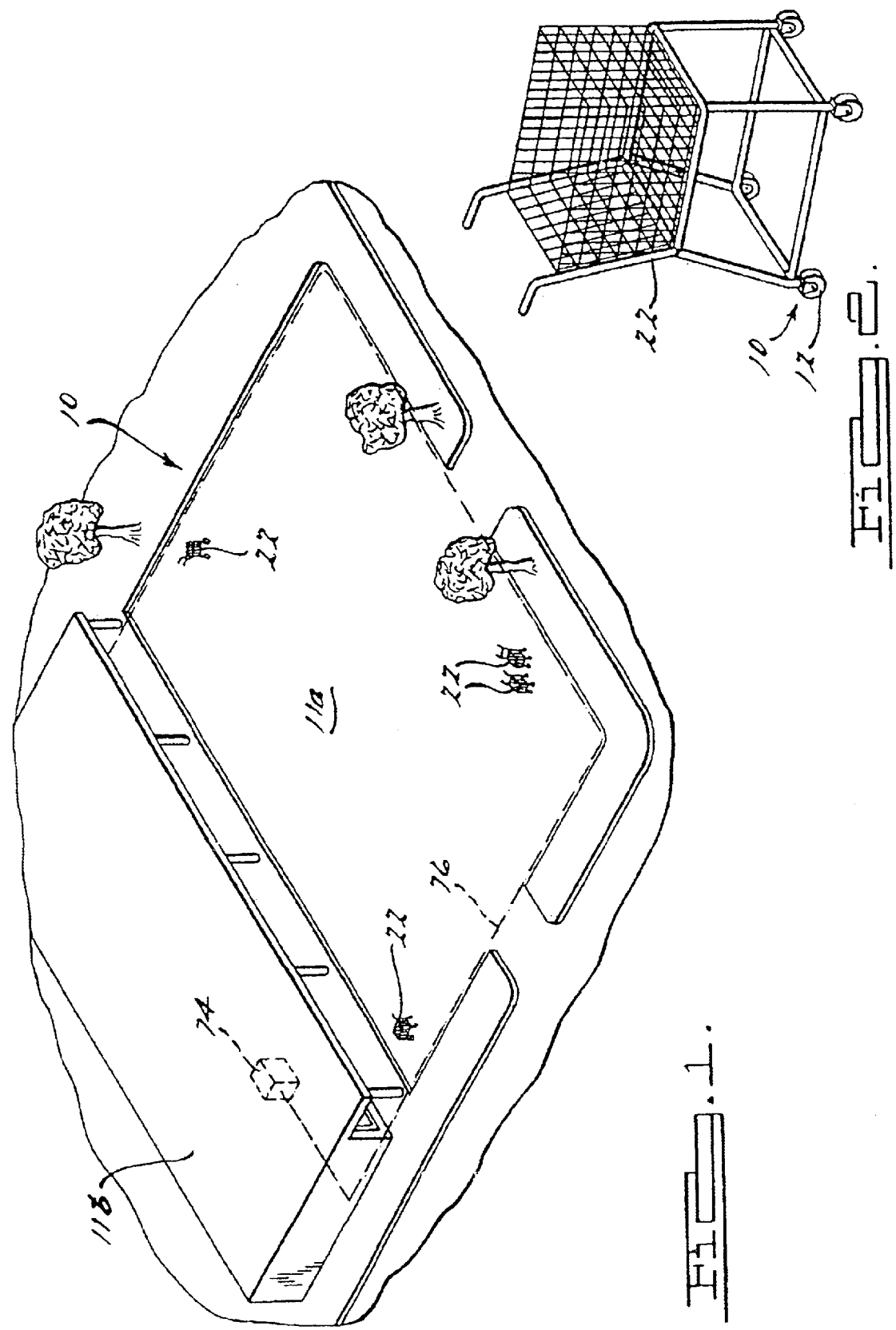

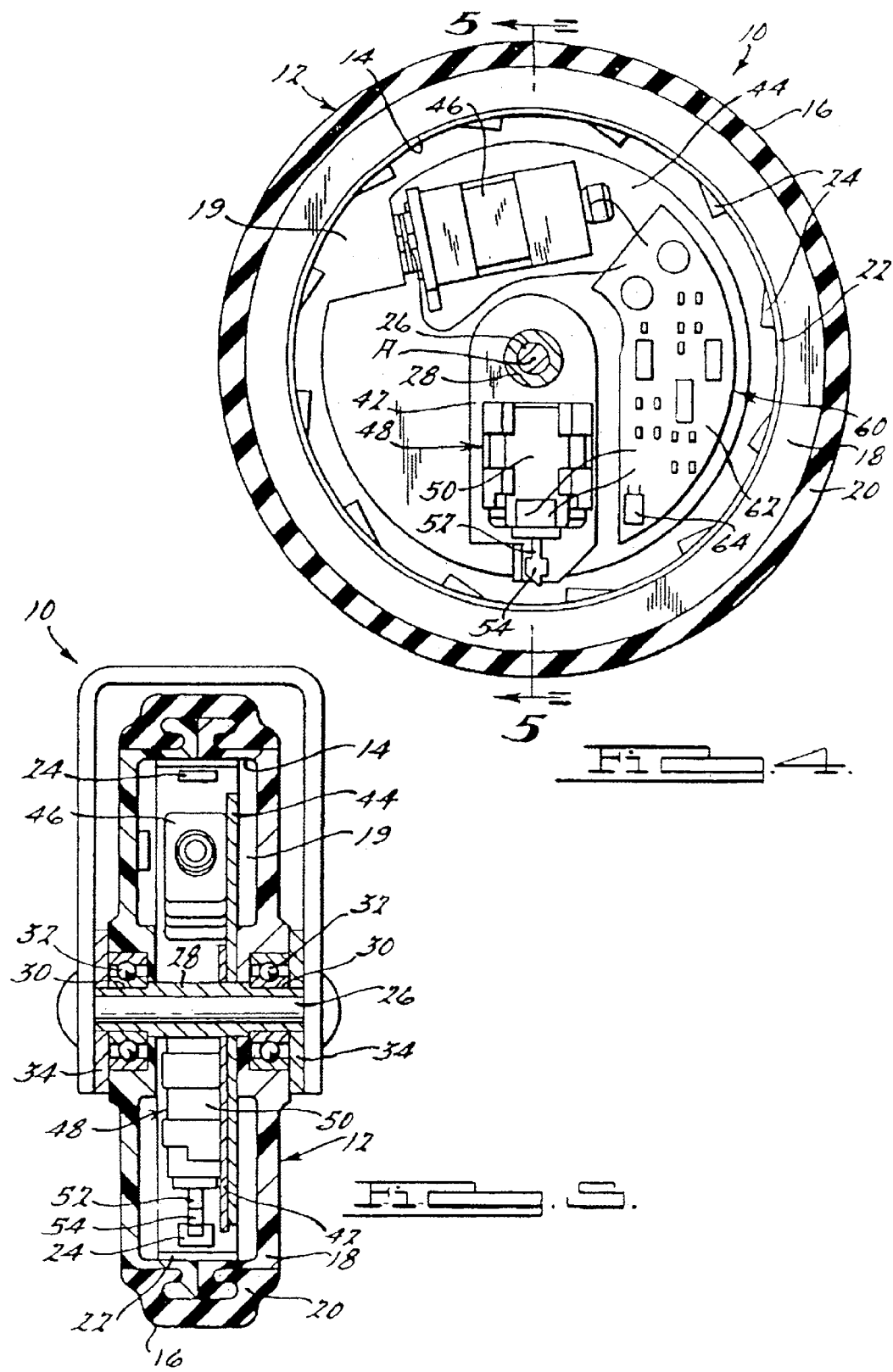

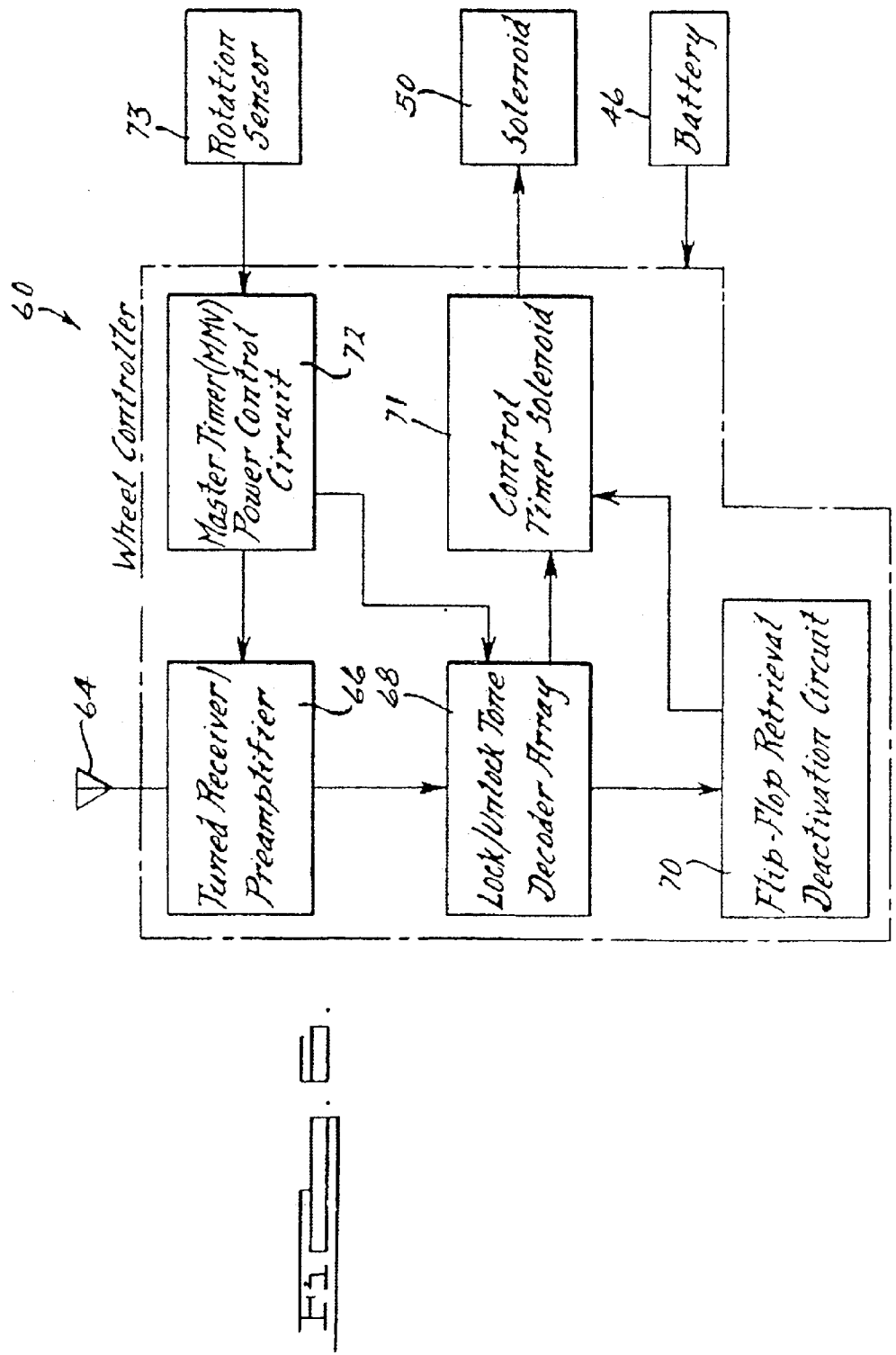

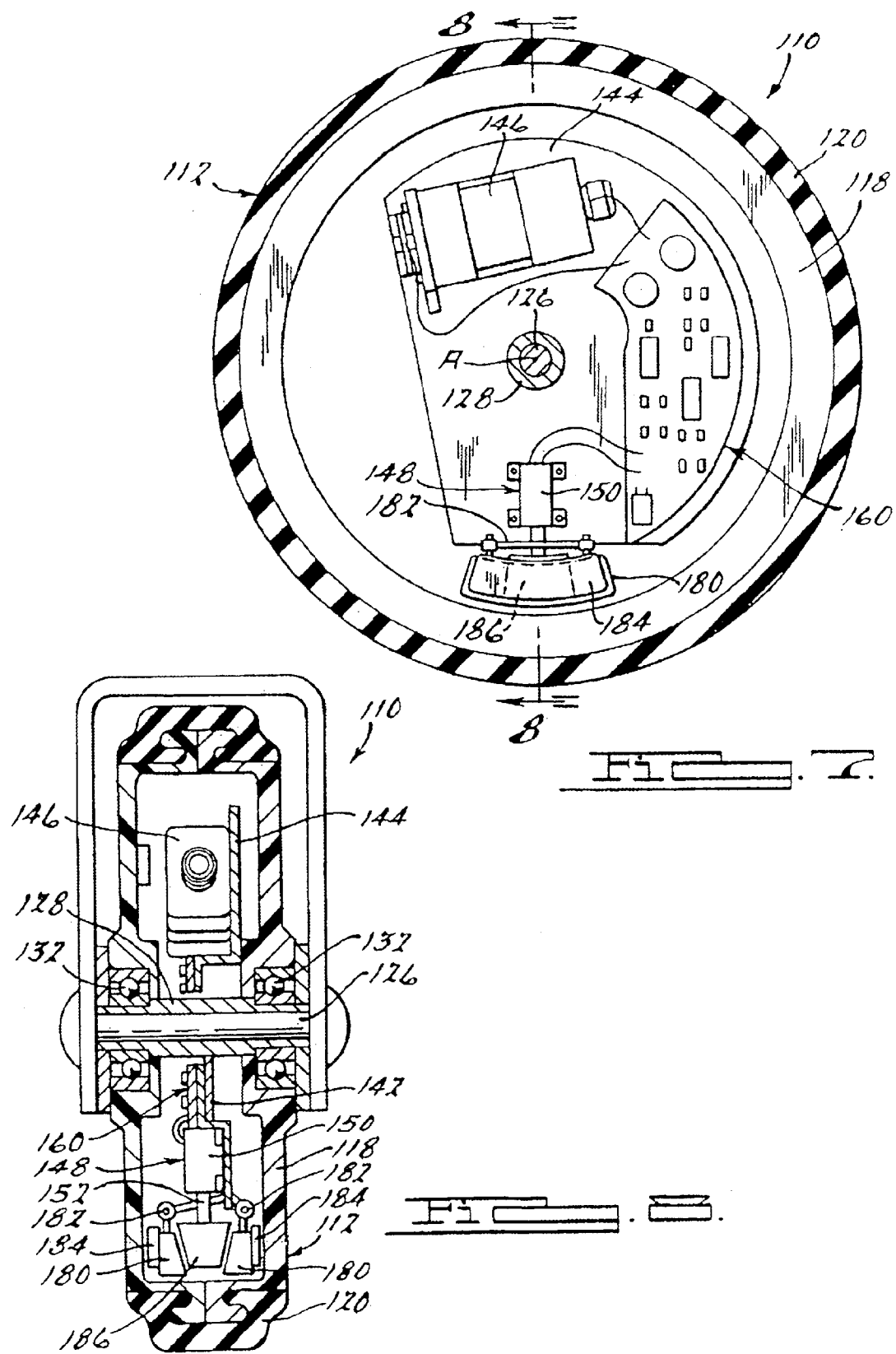

ANTI-THEFT VEHICLE SYSTEM

BACKGROUND OF THE INVENTION

1. Field of the Invention

The present invention relates generally to vehicles and, more particularly, to an anti-theft vehicle system used to inhibit rotation of a vehicle wheel outside a predetermined spatial perimeter.

2. Description of the Related Art

It is sometimes desired to contain a vehicle within a predetermined spatial boundary or perimeter. In particular, retail stores are attempting to reduce the amount of lost vehicles such as shopping carts, which are either stolen or taken out of the normal bounds of the stores and not returned.

Accordingly, U.S. Pat. No. 5,194,844 to Zelda discloses a vehicle theft prevention system, which inhibits the use of a shopping cart once it is moved outside a boundary. This patented system includes an electronic wire that extends around and defines a perimeter of normal operating space, which is used by operators of a store's shopping carts. The electronic wire produces an electromagnetic field that is sensed by a sensor located adjacent one wheel of the shopping cart. The sensor sends a signal to a motor that moves a brake pad against the wheel of the shopping cart. Two limit switches are used to stop the motor when the motor has either moved the brake pad into or out of engagement with the wheel of the shopping cart.

One disadvantage of the above system is that it is relatively expensive because the motor must be large and two limit switches are needed. Another disadvantage of the above system is that the motor and brake pad are disposed outside of the wheel.

To overcome these disadvantages, U.S. Pat. No. 5,315,290 to Moreno et al. discloses a cart theft prevention system. This patented cart theft prevention system includes a mechanism disposed inside the wheel. The mechanism includes a radio frequency receiver and a solenoid device connected to the receiver, both of which are disposed inside the wheel. The solenoid has an armature to engage and disengage an opening in a non-rotating shaft. When the receiver detects that the cart has been moved outside the prescribed use area, the solenoid device is energized to drive its armature into the opening in the non-rotating support shaft supporting the wheel, thereby locking the wheel against rotation and immobilizing the cart.

One disadvantage of the above system is that it fully encases its components and battery in the rubber wheel compound making repair or battery replacement difficult. Another disadvantage is that the system uses an actuated pin that aligns with a bore in the stationary axle to lock the wheel, which requires a special wheel frame to accommodate the square-keyed axle bolt and secondly offers only two locking opportunities per revolution. Yet another disadvantage of this system is that it makes retrofitting to existing carts costly and difficult. Still another disadvantage of this system is that the manner in which the wheel locks is susceptible to misalignment and non-engagement, and if the wheel successfully locks, causes wear to occur at only two specific areas on the wheel tread surface. Therefore, there is a need in the art to provide an anti-theft vehicle system that overcomes these disadvantages.

SUMMARY OF THE INVENTION

It is, therefore, one object of the present invention to provide an anti-theft vehicle system for vehicles.

It is another object of the present invention to provide an anti-theft vehicle system for vehicles such as shopping carts, toys, wheeled inventory, and industrial forklifts.

It is yet another object of the present invention to provide an anti-theft vehicle system for a vehicle wheel to prevent an operator from moving the vehicle outside a predetermined spatial perimeter.

It is still another object of the present invention to provide an anti-theft vehicle system for a shopping cart wheel that is inexpensive and effective at making it difficult for an operator to move the shopping cart out of a predetermined operating area of a retail store.

It is a further object of the present invention to provide an anti-theft vehicle system for a shopping cart wheel that incorporates a linear actuated brake to lock and unlock the wheel.

To achieve the foregoing objects, the present invention is an anti-theft vehicle system for a vehicle wheel having a rotational axis. The anti-theft vehicle system includes a linear actuator disposed within the vehicle wheel for operatively engaging and disengaging an interior surface of the vehicle wheel to resist and allow rotational movement of the vehicle wheel about the rotational axis. The anti-theft vehicle system further includes a receiver mounted within the vehicle wheel to receive a signal to activate the linear actuator.

One advantage of the present invention is that an anti-theft vehicle system is provided for vehicles such as shopping carts, toys, wheeled inventory, and industrial forklifts. Another advantage of the present invention is that the anti-theft vehicle system provides a vehicle wheel, which deters an operator from moving the vehicle outside a predetermined spatial perimeter. Yet another advantage of the present invention is that the anti-theft vehicle system provides a cost effective vehicle wheel to deter operators from taking shopping carts out of a retail store's shopping cart boundary by preventing the vehicle wheel from rotating. A further advantage of the present invention is that the anti-theft vehicle system incorporates a linear actuated brake disposed within the wheel for allow existing shopping carts to be retrofitted in a cost effective manner.

Other objects, features and advantages of the present invention will be readily appreciated, as the same becomes better understood, after reading the subsequent description when considered in connection with the accompanying drawings.

BRIEF DESCRIPTION OF THE DRAWINGS

FIG. 1 is a perspective view of an anti-theft vehicle system, according to the present invention, illustrated in operational relationship with vehicles and a predetermined spatial perimeter.

FIG. 2 is a perspective view of the anti-theft vehicle system, according to the present invention, and the vehicle of FIG. 1.

FIG. 4 is a sectional view taken along line 4—4 of FIG. 3.

FIG. 5 is a sectional view taken along line 5—5 of FIG. 4.

FIG. 6 is a schematic view of a control circuit of the anti-theft vehicle system of FIGS. 1 through 5.

FIG. 7 is a sectional view of another embodiment, according to the present invention, taken along line 7—7 of FIG. 3.

FIG. 8 is a sectional view taken along line 8—8 of FIG. 7.

DESCRIPTION OF THE PREFERRED EMBODIMENT(S)

Figure 3:
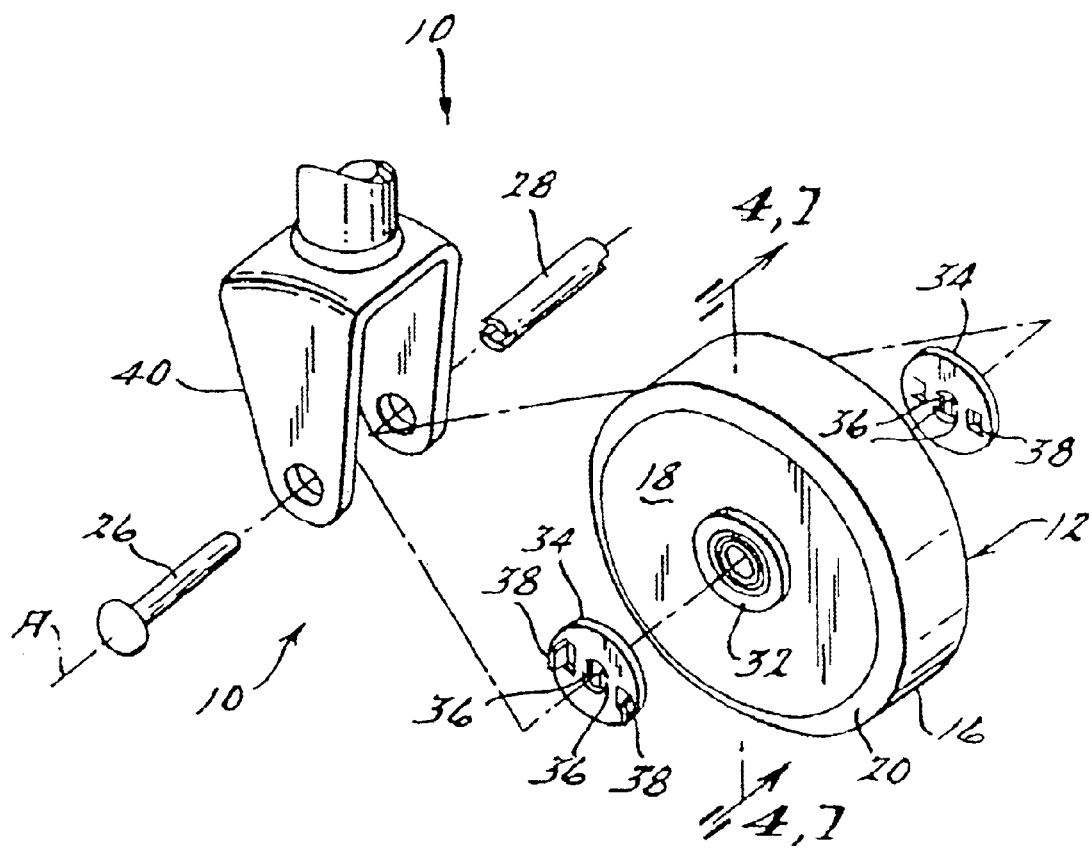
FIG. 3 is an exploded view of a portion of the anti-theft vehicle system of FIGS. 1 and 2.

Referring to FIG. 1, one embodiment of an anti-theft vehicle system 10, according to the present invention, is shown in operational relationship with vehicles inside a predetermined spatial boundary. In one embodiment, the anti-theft vehicle system 10 is used to prevent theft of vehicles such as shopping carts 22 from a predetermined spatial boundary or perimeter 11a of a retail store 11b. It should be appreciated that the system 10 may be used on other vehicles such as toys, wheeled inventory, and industrial forklifts to prevent the same from exiting the predetermined spatial boundary 11a.

Referring to FIGS. 2 through 5, the anti-theft vehicle system 10 includes at least one wheel, generally indicated at 12, for the vehicle embodiment of the shopping cart 22. The wheel 12 has an inner diameter 14 and an outer diameter 16 and a rotational axis A about which the wheel 12 rotates. The wheel 12 also has a housing or hub 18 forming a cavity 19 therein. The hub 18 is made of a rigid material such as plastic. Preferably, the hub 18 is made of a plastic material such as ABS or glass-filled reinforced nylon. It should be appreciated that the hub 18 protects internal components from the outside environment.

The wheel 12 also includes a surface engaging member or rolling tread 20 secured to the hub 18. The surface engaging member 20 is made of a suitable material such as a rubber material. It should be appreciated that the surface engaging member 20 secures the two half shells of the hub 18 together. It should also be appreciated that the surface engaging member 20 engages the surface of the predetermined spatial boundary 11a.

The anti-theft vehicle system 10 also includes a lock ring 22 disposed adjacent the inner diameter 14 of the wheel 12. The lock ring 22 is generally circular in shape and has a plurality of protrusions or lock ridges 24 disposed thereabout for a function to be described. The lock ridges 24 are generally triangular in shape. The lock ridges 24 extend radially inwardly and are spaced circumferentially about the lock ring 22. The lock ring 22 is secured to the hub 18 by suitable means such as welding. The lock ring 22 is made of a rigid material such as metal. The lock ring 22 and lock ridges 24 are a monolithic structure being integral, unitary, and one-piece. It should be appreciated that the lock ridges 24 may be formed on the inside surface of the hub 18. It should also be appreciated that the lock ridges 24 are spaced at regular intervals on the inside diameter 14 of the wheel 12.

The anti-theft vehicle system 10 further includes an axle pin or shaft 26 extending through the cavity 19 of the hub 18, which acts as the rotational axis A for the wheel 12. The shaft 26 is made of a metal material such as steel. The anti-theft vehicle system 10 also includes a hollow axle 28 disposed over the shaft 26. The axle 28 has at least one, preferably a pair of reduced outer diameter portions forming seats 30 at the ends thereof. The anti-theft vehicle system 10 also includes two bearings 32 disposed between the hub 18 and the axle 28. The bearings 32 are disposed in the seats 30 of the axle 28. The anti-theft vehicle system 10 includes yoke lock plates 34 supported by the axle 28. The yoke lock plates 34 may include internal notches 36 which engage the axle 28 and outward extending tabs 38 that engage a vehicle wheel frame 40, thus holding the axle 28 stationary and preventing it from rotating.

The anti-theft vehicle system 10 includes an axle plate 42 disposed about the axle 28 and within the cavity 19 of the hub 18. The axle plate 42 is securely mounted, such as by welding, about the axle 38. The axle plate 42 is made of a metal material such as steel. The anti-theft vehicle system 10 also includes a mounting plate or chassis 44 disposed within the cavity 19 of the hub 18 and connected to the axle plate 42 by suitable means such as a rivet. The chassis 44 is generally circular in shape for a function to be described. It should be appreciated that the axle plate 42 links the chassis 44 to the axle 28. It should also be appreciated that the axle 28 is non-rotatable and that the axle plate 42 sustains the locking torque transmitted by the rolling element of the hub 18 and surface engaging member 20 when it stops.

The anti-theft vehicle system 10 further includes a power supply such as a battery 46 disposed within the cavity 19 of the hub 18 and mounted to the chassis 44. The battery 46 is electrically connected by wires to a control circuit 60 to be described to provide power thereto. It should be appreciated that the battery 46 is attached to the chassis 44 by suitable means such as clips.

The anti-theft vehicle system 10 includes a linear actuator, generally indicated at 48, disposed within the cavity 19 of the hub 18 and mounted to the chassis 44. The linear actuator 48 has linear movement to engage and disengage the protrusions 24 of the lock ring 22. Preferably, the linear actuator 48 includes a solenoid 50, more preferably of a two-way or "push-pull" type, mounted to the axle plate 42. The linear actuator 48 also includes a plunger 52 extending radially from the solenoid 48, which is moved linearly by the solenoid 48 when the solenoid 48 is energized and de-energized. The plunger 52 may include a stepped locking member or index 54 at a free end thereof to engage and disengage one of the lock ridges 24. The index 54 fits the lock ridges 24 on the lock ring 22. The index 54 is made of a rigid material such as metal. The solenoid 50 is electrically connected by wires to a control circuit 60 to be described to receive power and be electrically activated and de-activated. The solenoid 50 may be of a type commercially available and known as a Richmeg Open-Frame Solenoid of RG-O-0420 L & S or RG-O-0837 L & S. It should be appreciated that the lock ridges 24 are wedge shaped to prevent damage to the solenoid 50 or the plunger 52 if the solenoid 50 is activated while directly over one of the lock ridges 24. It should also be appreciated that the wedge shape of the lock ridges 24 ensures that the wheel 12 is slightly advanced to allow the plunger 52 to fully extend.

Referring to FIG. 6, the anti-theft vehicle system 10 includes a control circuit, generally indicated at 60. The control circuit 60 is an electronic printed circuit board 62, which is disposed within the cavity 19 of hub 18 of the wheel 12 and mounted to the chassis 44. The control circuit 60 includes a receiver 64 for receiving a signal to activate the solenoid 50 to move the plunger 52 to engage or disengage the wheel 12. Preferably, the receiver 64 is an antenna that receives a perimeter signal such as an RF signal created by a signal generator 74 to be described. The perimeter signal is created by the signal generator 74 and a buried wire cable 76 to be described and illustrated in FIG. 1.

The control circuit 60 includes a tuned receiver 66 that receives the perimeter signal from the receiver 64, amplifies it and sends it to a tone decoder 68 for decoding the perimeter signal. The control circuit 60 also includes a flip-flop retrieval deactivation circuit 70 and a solenoid control timer 71, which receive the signal once it has been decoded. The flip-flop retrieval deactivation circuit 70 determines which direction that the solenoid 50 must be activated. More specifically, the flip flop retrieval deactivation circuit 70 will signal the solenoid control timer 71 to operate the solenoid 50 dependent upon the input received by the flip flop retrieval deactivation circuit 70 and the tone decoder 68. The control circuit 60 further includes a master timer 72 that receives input from a rotation sensor 73 such as a magnet.

For example, the flip flop retrieval deactivation circuit 70 receives input from the tuned receiver 66 stating the location of the shopping cart 22 has changed such that the shopping cart 22 has passed over a buried wire cable 76 signifying that the shopping cart 22 has passed either into or out of the perimeter defined by the buried wire cable 76. The flip-flop retrieval deactivation circuit 70 then determines whether the shopping cart 22 was inside or outside the buried wire cable 76 by determining whether the wheel 12 was rotating. From the rotation sensor 73, determination of the rotation of the wheel 12 will determine whether the shopping cart 22 was inside or outside of the buried wire cable 76. If the rotation sensor 73 receives no signal, the wheel 12 is not rotating and is already locked. Therefore, receiving a signal from the tuned receiver 66 will indicate that the shopping cart 22 has passed back into the perimeter of the allowed area for the shopping cart 22 to operate. The rotational state of the wheel 12 goes from a non-rotating state to a rotating state. If, however, the flip flop retrieval deactivation circuit 70 receives a signal from the tuned receiver 66 when the rotation sensor 73 is sending a signal indicating that the wheel 12 is rotating, it will be determined that the shopping cart 22 has moved to a location outside of the perimeter defined by the buried wire cable 76 and will activate the solenoid 50 such that the plunger 52 will engage the locking ridges 24, preventing the wheel 12 from rotating. Thus, the rotational state of the wheel 12 has gone from a rotating state to a non-rotating state. It should be appreciated that when the control circuit 60 recognizes the lock signal, the solenoid 50 is energized to push the plunger 52 out and that the plunger 52 remains in the lock position until the control circuit 60 receives the reverse or unlock signal. It should also be appreciated that a hand held signal generator (not shown) may be used to send a locking and unlocking signal to operate each wheel 12 individually. It should further be appreciated that more lock ridges 24 disposed about the inside the wheel 12 results in more even tread wear.

The signal generator 74, shown in FIG. 1, generates a square wave output having a low frequency cycle between 60 Hz and 9 kHz that is sent along the buried wire cable 76 and defines the area in which the shopping cart 22 may operate. The signal generator 74 may be any type of signal generator suitable to produce a signal that will pass along the entire length of the buried wire cable 76.

Referring to FIGS. 7 and 8, another embodiment, according to the present invention, of the anti-theft vehicle system 10 is shown. Like parts have like reference numerals increased by one hundred (100). In this embodiment, the anti-theft vehicle system 110 includes the hub 118, surface engaging member 120, shaft 126, axle 128, bearings 132, yoke lock plates 134, axle plate 142, chassis 144, battery 146, linear actuator 148, solenoid 150, plunger 152, and control circuit 160. The anti-theft vehicle system 110 also includes a pair of wedge members 180 disposed within the cavity 119 of the hub 188 and spaced axially. The wedge members 180 extend circumferentially and are generally trapezoidal in cross-sectional shape. The anti-theft vehicle system 110 also includes a pair of hinges 182 to pivotally connect the wedge members 180 to the chassis 144. The anti-theft vehicle system 110 includes a pair of friction pads 184 with each being connected to one of the wedge members 180. The friction pads 184 extend circumferentially and are generally planar in shape. The friction pads 184 engage and disengage the interior surface of the hub 118. The anti-theft vehicle system 110 also includes a sloped wedge 186 disposed upon the outward end of the plunger 152 to move the wedge members 180. The sloped wedge 186 is generally trapezoidal in shape. In operation, when the anti-theft vehicle system 110 is activated, the solenoid 150 is electrically energized and the sloped wedge 186 is driven outwardly between the wedge members 180 causing them to move axially and press the friction pads 184 against the interior surface of the hub 118 to apply a friction brake to lock the wheel 112. It should be appreciated that the anti-theft vehicle system 110 not only locks the wheel 112 randomly, making the tread to wear evenly, but also offers a progressive braking feature.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An anti-theft vehicle system for a vehicle wheel having a rotational axis comprising:

a linear actuator having a movable plunger disposed within the vehicle wheel, said linear actuator moving said plunger radially along an axis extending through the rotational axis toward and away an interior surface of the vehicle wheel, said linear actuator and said plunger being located alone the axis, said plunger having a free end being forced away from the rotational axis for operatively engaging the interior surface of the vehicle wheel, thereby causing the vehicle wheel to resist rotational movement about the rotational axis; and a receiver mounted within the vehicle wheel to receive a signal to activate said linear actuator.

2. An anti-theft vehicle system for a vehicle wheel as set forth in claim 1 wherein said linear actuator comprises a solenoid.

3. An anti-theft vehicle system for a vehicle wheel as set forth in claim 2 including a lock ring mounted to the interior surface of the vehicle wheel.

4. An anti-theft vehicle system for a vehicle wheel as set forth in claim 3 wherein said lock ring includes a plurality of protrusions spaced circumferentially thereabout, said plunger engaging and disengaging one of said protrusions.

5. An anti-theft vehicle system for a vehicle wheel as set forth in claim 4 including an index disposed on one end of said plunger for contacting said protrusions.

6. An anti-theft vehicle system for a vehicle wheel as set forth in claim 1 including an axle plate fixed to an axle of the vehicle wheel.

7. An anti-theft vehicle system for a vehicle wheel as set forth in claim 1 including a chassis connected to said axle plate, said linear actuator being mounted to said chassis.

8. An anti-theft vehicle system for a vehicle wheel having a rotational axis comprising:

a plurality of protrusions disposed within the vehicle wheel;

a linear actuator having a movable plunger disposed within the vehicle wheel, said linear actuator moving said plunger radially along an axis extending through the rotational axis toward and away said protrusions, said linear actuator and said plunger being located along the axis, said plunger having a free end being forced away from the rotational axis to engage one of said protrusions, thereby causing the vehicle wheel to resist rotational movement about the rotational axis; and a receiver mounted within the vehicle wheel to receive an electrical signal to activate said linear actuator.

9. An anti-theft vehicle system as set forth in claim 8 wherein said linear actuator comprises a solenoid.

10. An anti-theft vehicle system as set forth in claim 8 including a lock ring mounted to the interior surface of the vehicle wheel, said protrusions being spaced circumferentially about said lock ring and said plunger engaging and disengaging one of said protrusions.

11. An anti-theft vehicle system for a vehicle wheel as set forth in claim 10 including an stepped member disposed on one end of said plunger for contacting said protrusions.

12. An anti-theft vehicle system as set forth in claim 8 including an axle plate fixed to an axle of the vehicle wheel.

13. An anti-theft vehicle system for a vehicle wheel as set forth in claim 12 including a chassis connected to said axle plate, said linear actuator being mounted to said chassis.

14. An anti-theft vehicle system for a vehicle wheel having a rotational axis comprising:

a solenoid and a movable plunger disposed with in the vehicle wheel, said plunger extending radially from said solenoid and being slideably attached thereto for movement radially along an axis extending through the rotational axis, said solenoid and said plunger being located along the axis, said plunger having a free end being forced away from the rotational axis for operatively engaging an interior surface of the vehicle wheel, thereby causing the vehicle wheel to resist rotational movement about the rotational axis; and a receiver mounted within the vehicle wheel to receive a signal to activate said linear actuator.

* * * * *